May 29, 1962 A. R. BONE 3,036,520
INDICIA APPLYING MACHINE
Filed June 6, 1958 11 Sheets-Sheet 1

FIG. 1

INVENTOR.
ARNOLD R. BONE
BY
ATT'YS

May 29, 1962

A. R. BONE 3,036,520

INDICIA APPLYING MACHINE

Filed June 6, 1958

INVENTOR.
ARNOLD R. BONE
BY
Roberts, Cushman & Grover
ATT'YS.

May 29, 1962  A. R. BONE  3,036,520
INDICIA APPLYING MACHINE
Filed June 6, 1958  11 Sheets-Sheet 4

INVENTOR.
ARNOLD R. BONE
BY
Roberts, Cushman & Grover
ATT'YS.

May 29, 1962 A. R. BONE 3,036,520
INDICIA APPLYING MACHINE
Filed June 6, 1958 11 Sheets-Sheet 5

INVENTOR.
ARNOLD R. BONE
BY Roberts, Cushman & Grover
ATT'YS.

May 29, 1962

A. R. BONE 3,036,520

INDICIA APPLYING MACHINE

Filed June 6, 1958

INVENTOR.
ARNOLD R. BONE
BY Roberts, Cushman & Grover
ATT'YS.

May 29, 1962  A. R. BONE  3,036,520
INDICIA APPLYING MACHINE
Filed June 6, 1958  11 Sheets-Sheet 8

INVENTOR.
ARNOLD R. BONE
BY
Roberts, Cushman & Grover
ATT'YS.

May 29, 1962

A. R. BONE 3,036,520

INDICIA APPLYING MACHINE

Filed June 6, 1958

INVENTOR.
ARNOLD R. BONE
BY
*Roberts, Cushman & Grover*
ATT'YS.

May 29, 1962  A. R. BONE  3,036,520
INDICIA APPLYING MACHINE
Filed June 6, 1958  11 Sheets-Sheet 10

INVENTOR

ARNOLD R. BONE

BY Roberts, Cushman & Grover
ATT'YS

United States Patent Office 3,036,520
Patented May 29, 1962

3,036,520
INDICIA APPLYING MACHINE
Arnold R. Bone, Needham, Mass., assignor to Dennison Manufacturing Company, Framingham, Mass., a corporation of Massachusetts
Filed June 6, 1958, Ser. No. 740,386
19 Claims. (Cl. 101—78)

This invention relates to a machine for applying indicia to sectional ticket material and is embodied in the preferred form of machine disclosed in the patent application of Donald D. Sloan and Alan M. Swett for Indicia Applying Machine, Serial No. 740,342, filed concurrently herewith and assigned to the assignee of this application.

The Sloan and Swett application may be referred to for an explanation of the problems involved in applying corresponding indicia, for instance corresponding printed numbers and coded perforations, to small ticket sections, at different stations, and automatically changing the indicia in predetermined regular order for either consecutive or repeat operation. As explained in the Sloan and Swett application an example of consecutive operation is to increase the printed and punch coded number by one for each ticket section, and an example of repeat operation is to increase the number by one for each multiple section ticket but repeat the same number on each of the sections of the ticket.

Briefly summarized, one of the difficulties in constructing a machine for these operations arises from the fact that if indicia applying devices are to operate at different stations they must on some occasions in repeat operation and on all occasions in consecutive operation have different settings when they apply their respective indicia. An attempt to gear the two devices together so that the setting of the forward one is say two units lower than the setting of the rear one would be met by the objection that this relation of settings is not suitable for repeat operation wherein the two devices at times would operate upon sections of the same ticket, at which times a difference in setting would prevent repeat operation.

The Sloan and Swett application introduces the principle of operating the two indicia applying devices at different times in the same cycle, automatically changing the settings of both devices at times which intervene between the respective operations of the two devices in such cycle, and to permit of repeat operation, controlling this change so that the change only occurs in case the leading section of a ticket is at the rear station, avoiding a change when any given ticket spans the two stations. The present invention aims to simplify mechanism of this kind and, as indicated above, is directed to certain features of the preferred form of machine disclosed in the Sloan and Bone application.

Other objects and advantages of the invention will be apparent from this specification and its accompanying drawings wherein the invention is explained by way of example.

In the accompanying drawings, a cover which normally covers the printing and punching head of the machine, but which is removable for inspection of the machine and which forms no part of the present invention, is assumed to be removed and, accordingly, does not appear.

In the accompanying drawings.

The general organization of the illustrated machine, so far as concerns feeding the ticket material through the machine, printing the upper line of printed indicia on each ticket section and punching the corresponding indicia in code, as well as stopping the machine when a predetermined number of tickets have been printed and punched and stopping the machine when the tickets exhaust, is similar to that of the patent application of Arnold R. Bone and Donald D. Sloan, Serial No. 493,754, filed March 11, 1955, now U.S. Patent No. 2,890,650, and the Bone and Sloan application may be referred to for details of construction, which however are not essential to an understanding of the principles of the present invention.

As in the Bone and Sloan application the machine includes a manually settable bank of print wheels 20 some ones of which are interconnected by gearing to individual ones of a bank of interposer wheels 22, in order to print and punch corresponding indicia in a top line of printing and in a central punching field of each ticket section.

The machine of the Bone and Sloan application also includes a second bank of manually settable print wheels for printing a bottom line of indicia on each ticket section. The present machine, instead of this second bank of manually settable wheels, provides an automatically changeable bank of numbering print wheels. These are interconnected to certain ones of the interposers 22 so that corresponding numerical indicia is printed and punched and this indicia can be automatically changed during the course of a run, either according to consecutive operation or repeat operation as above referred to.

Figure 11:
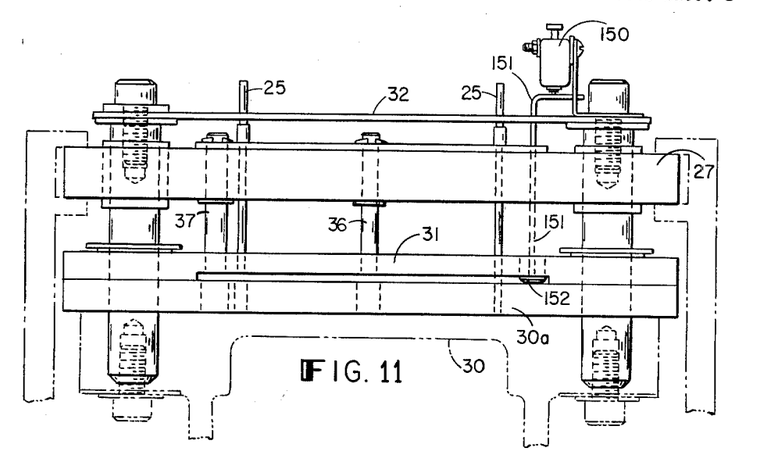
FIG. 11 is a vertical partial section on the line 11—11 of FIG. 1, showing the punching station and a ticket sensing means.
Figure 12:
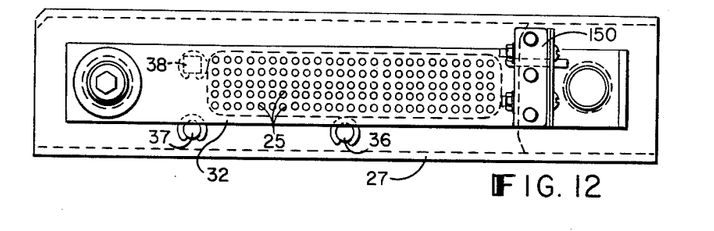
FIG. 12 is a plan of the mechanism of FIG. 11.

Punches 25 for punching coded indicia are carried by a stationary cross member 27, FIGS. 11 and 12, only two of the considerable number of these punches being shown in FIG. 11. As shown in FIG. 12 the numerous code punches 25 are arranged in columns of five. Each column is controlled by a single one of the interposer wheels 22 which occupies a position above the column of punches. By way of example there may be twenty-five interposer wheels 22, and, counting from the side visible in FIG. 1 or from the left in FIG. 12 the alternate interposer wheels commencing with the fifteenth and ending with the twenty-third, i.e., five in all, are connected to and controlled by the counter mechanism subsequently described and punch in code the numbers printed by automatically changed numbering print wheels. These five numbering interposers each have ten positions representing zero and the digits one to nine, in each of which ten positions two punches 25 of each column are rendered operative to punch. The particular code employed is basically a one, two, four, seven code, with zero represented by four in conjunction with seven, and with a numerally-valueless top punching position in which a punch is made in those cases where the particular digit requires only one punched hole. In the illustrations of tickets in FIGS. 14 and 15 the code perforations made by the code punches other than the automatic numbering punches are omitted and five columns of perforations P are shown, corresponding in each case to the numerals N applied by the numbering mechanism. The printed indicia which would normally be applied along the top of each ticket section by the print wheels 20 is also omitted.

As in the Bone and Sloan application the bed 30 of the machine rises vertically and at the punches is formed as a lower die 30a, FIG. 11, and an upper die or ticket stripper 31 with a gap therebetween for the ticket material. The code punches 25 are vertically movable in the stationary member 27 but selected punches can be held down by the interposer wheels 22 and caused to punch. A vertically movable stripper plate 32 insures that all punches are clear of the interposer wheels when the bed is in its lower positions.

Figure 14:
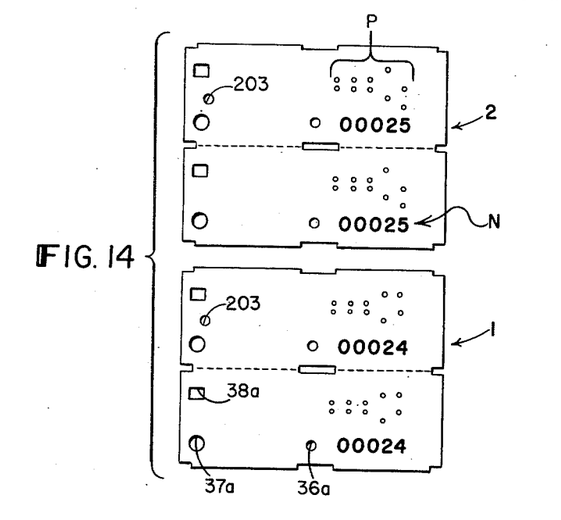
FIG. 14 is a plan showing tickets printed and punched by repeat operation.
Figure 15:
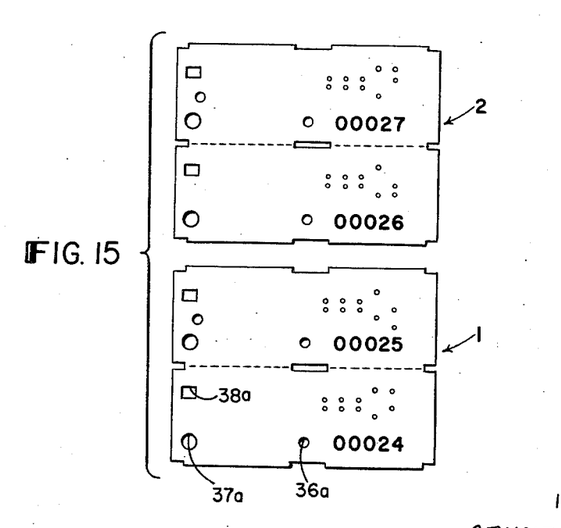
FIG. 15 is a plan showing tickets printed and punched by consecutive operations.

Larger stationary punches 36, 37 and 38 are carried by the stationary member 27 and punch locating holes in each ticket section, these holes being indicated by the corresponding characters 36a, 37a and 38a in the tickets of FIGS. 14 and 15.

Figure 1:
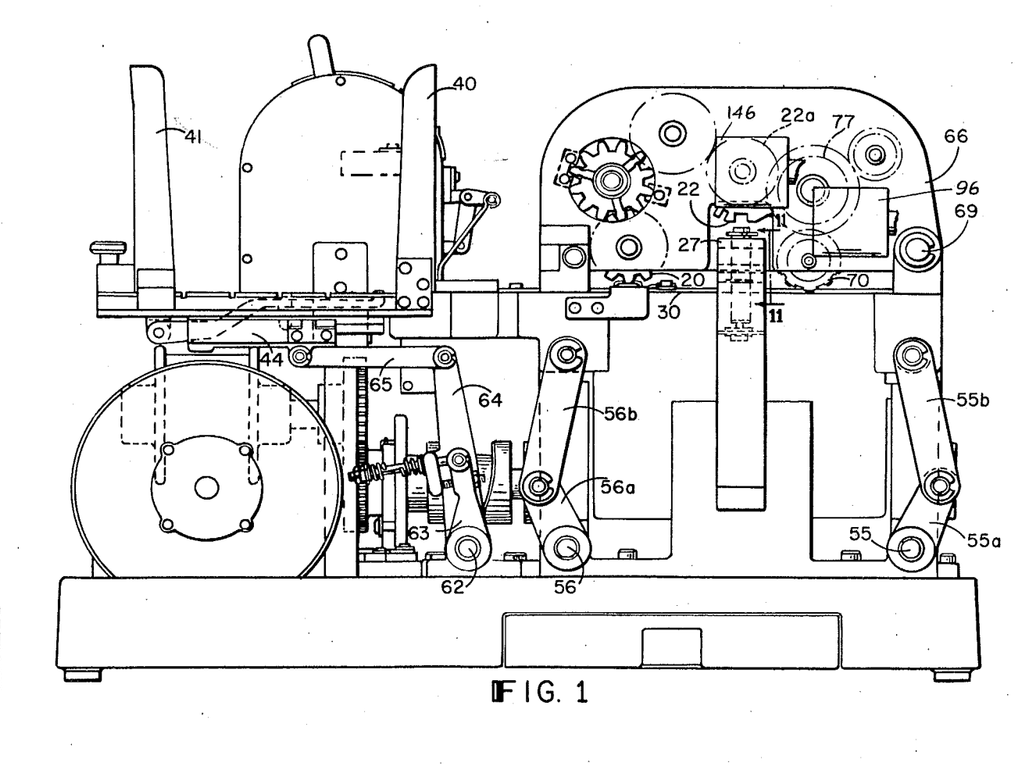
FIG. 1 is a side elevation of a printing and punching machine having the present invention applied thereto, this side being herein designated the left side.

A ticket magazine is carried by the left end of the bed, FIG. 1, and is shown as including a front end section 40 and an adjustable rear end section 41 which can be shifted to various distances from the front end section 40 to accommodate stacks of tickets of different lengths. A ticket section is customarily one inch in length.

If continuous strips of sectional ticket material are to be employed the machine may be modified, for instance as disclosed in the Bone and Sloan application, by inclusion of mechanism for severing the tickets from the strip, and the rear end section 41 of the magazine will be removed.

The invention is applicable to machines which may feed the ticket material through the machine in a continuous length and sever it into tickets of the desired number of sections after printing and punching rather than before. When reference is made to the position of the ticket with reference to either of the indicia-applying stations, it will be understood that such ticket may not yet have been severed from a strip, but simply consist of the sections which will constitute the ticket when severed from the strip.

Reciprocating feed means including feed bars and ticket pawls as described in the Bone and Sloan application, are operated from a slide 44 beneath the magazine and extend approximately to the right end of the machine and feed the ticket material from left to right, step by step by engagement with the feed slots and rear ends of the tickets. One such feed bar appears at 45 in the fragmentary sectional view of FIG. 18. Each step of feed is equal to the length of a ticket section, e.g., one inch. The location of the first bank of print wheels 20 and the bank of punches 25 controlled by interposer wheels 22 is such that two steps of feed are required to remove a ticket section from its position where it is printed by print wheels 20 and move this ticket section into the punching station, likewise as in the machine of the Bone and Sloan application.

As the bed rises to punch a given ticket section at the punching station, the second ticket section to the rear thereof is brought into contact with an ink ribbon (omitted from the drawings for clarity of illustration) and printed by the bank of print wheels 20. The intervening ticket section receives neither printing nor punching in this cycle.

Figure 2:
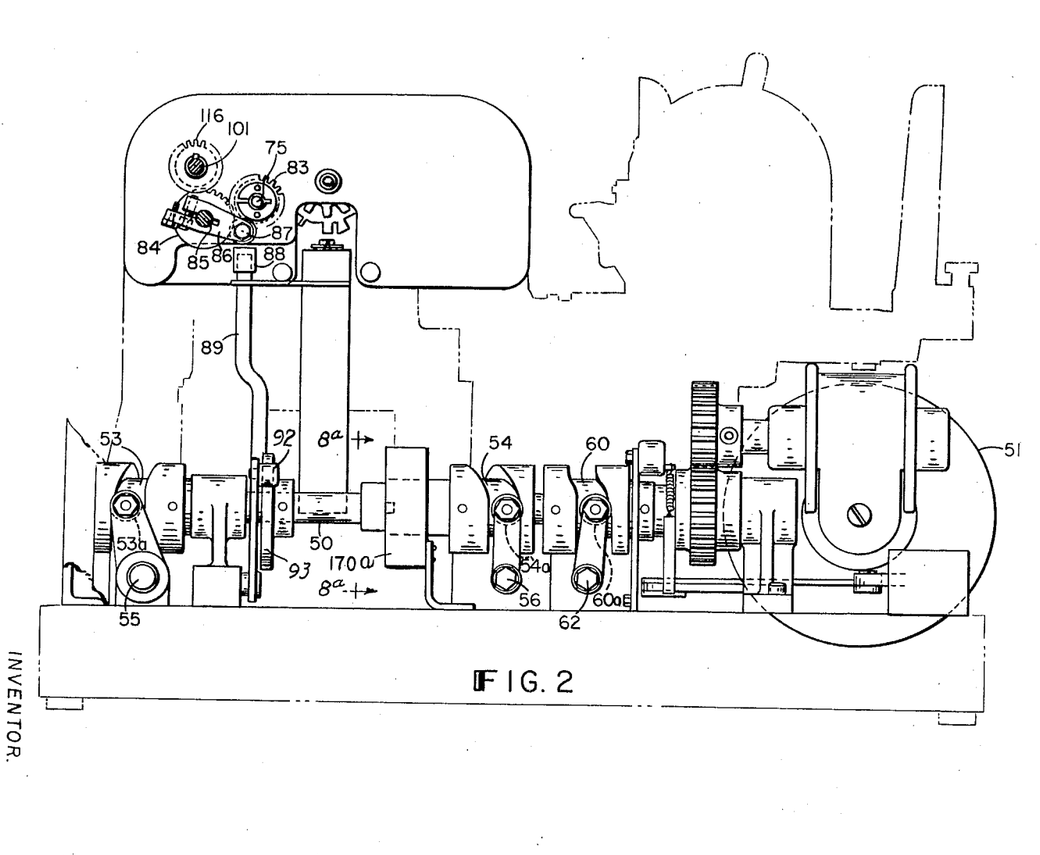
FIG. 2 is a diagram in the nature of a right side elevation omitting much of the structure of the machine, but showing certain parts of the side of the machine opposite to that shown in FIG. 1.
Figure 19:
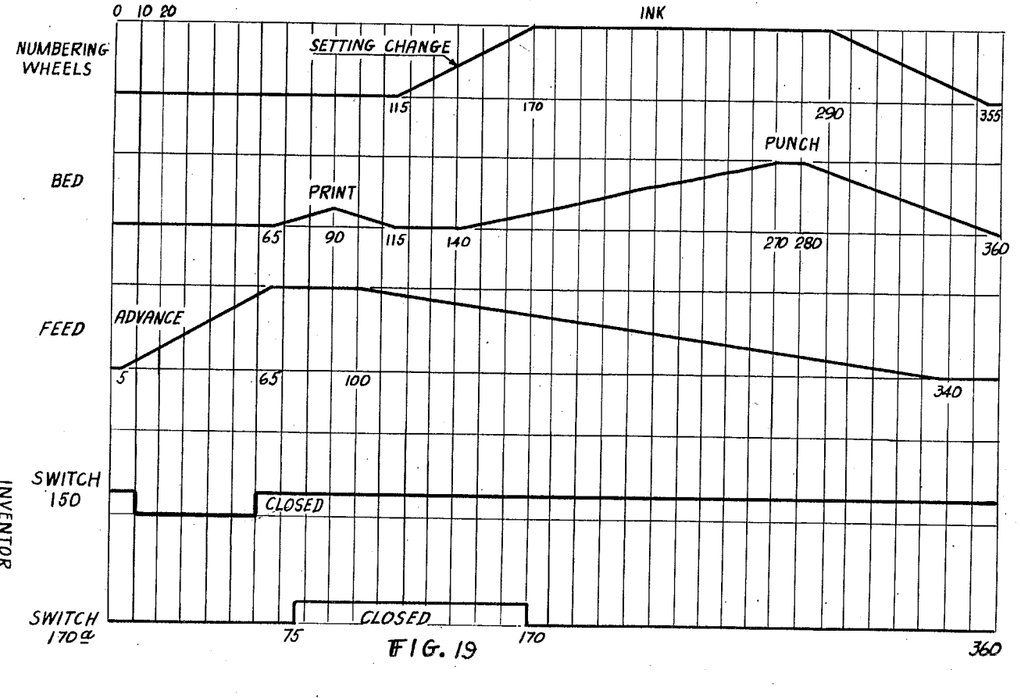
FIG. 19 is a timing diagram of the machine.

The up and down movement of the bed and the reciprocation of the feeding mechanism are derived from a camshaft 50, FIG. 2, driven through a suitable clutch and reduction gearing from a motor 51. The timing of these motions will be understood by referring to the timing diagram of FIG. 19.

Cams 53 and 54, FIG. 2, operate through followers 53a and 54a to rock a pair of shafts 55 and 56, which shafts are connected by toggles 55a, 55b and 56a, 56b, FIG. 1, to lift and lower the bed 30.

Cam 60 on shaft 50 operates through follower 60a to rock a shaft 62, and as shown in FIG. 1 shaft 62 is connected by interconnected levers 63, 64 and a link 65 to the slide 44 which reciprocates the feed bars of the ticket feeding means.

The frame of the printing and punching head of the machine consists mainly of vertical plates 66, 67 and 68 extending longitudinally of the bed, interconnected by various cross members and all pivotally mounted upon the axis 69, FIG. 1, so that the head as a whole can be swung upwardly to expose the bed and inspect the mechanism of the head.

Figure 7:
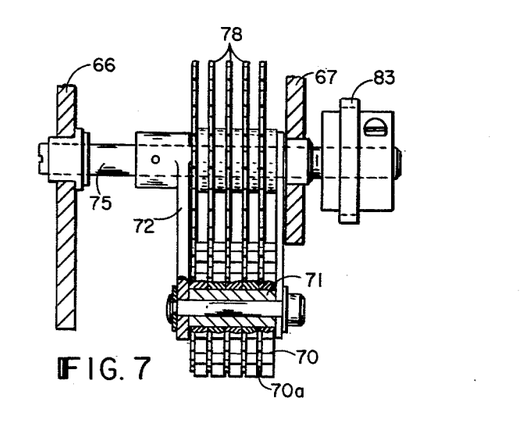
FIG. 7 is a partial section taken mainly on the line 7—7 of FIG. 4, through the axis of the idler gears and the print wheels with the latter in their printing position.

A bank of five numbering print wheels 70 carrying zero and the digits one to nine on their peripheries are freely rotatable upon a sleeve 71, FIG. 7, carried by an arm 72 which is fast upon a rock shaft 75. Rock shaft 75 carries fast thereon a gear 83 by which it is rocked as later described. Each numbering wheel 70, in addition to carrying the printing characters zero to nine, is provided with a ten tooth gear 70a fast therewith.

Figure 4:
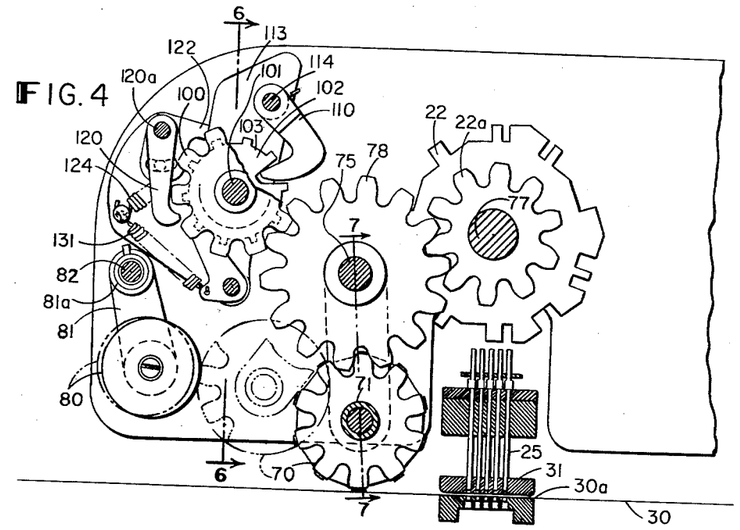
FIG. 4 is a partial section taken mainly on line 4—4 of FIG. 3 with some parts broken away and removed.

In FIG. 4 the bank of numbering wheels 70 is shown in full lines in its lower or printing position, in which position it is located at one feed step to the left of, that is, beyond, the punching station formed by the lower and upper punching dies 30a and 31.

In this same FIG. 4 the bank of numbering wheels is shown in broken lines as swung upwardly and to the left, by rocking of shaft 75, to its inking position.

The five interposers 22 with which the numbering mechanism cooperates each carry a ten tooth gear 22a and are freely rotatable upon a stationary spindle 77. The respective gears 70a of the print wheels are interconnected with the interposer gears 22a by idler gears 78 which are freely rotatable on rock shaft 75. Thus, with the print wheels in their printing position of FIG. 4 the setting of each print wheel and its interconnected interposer corresponds. The notching of each interposer is such as to control the punches 25 according to the code mentioned above, so that when any print wheel 70 is in position to print a given numerical character the corresponding interposer 22 is in position to cause the associated punches to punch the corresponding character in code. Thus as indicated above, the setting of each numbering print wheel and its corresponding interposer always corresponds.

Any suitable ink roll 80 is provided for inking the bank of print wheels. As shown in FIG. 4 the ink roll is carried by an arm 81 which is yieldably mounted upon a rock shaft 82, as later described.

As the bank of print wheels is rocked to and from inking position, the intermeshing of its set of gears 70a with the idler gears 78 rotates the bank of print wheels. The extent of this rotation and the location of the ink roll relative to the printing position of the print wheels are such that when a given printing character on the periphery of a printing wheel is inked by the ink roll, return of the printing wheel to printing position will bring this same character to the bottommost or printing position of the ten printing characters of the wheel.

Figures 8, 8A:
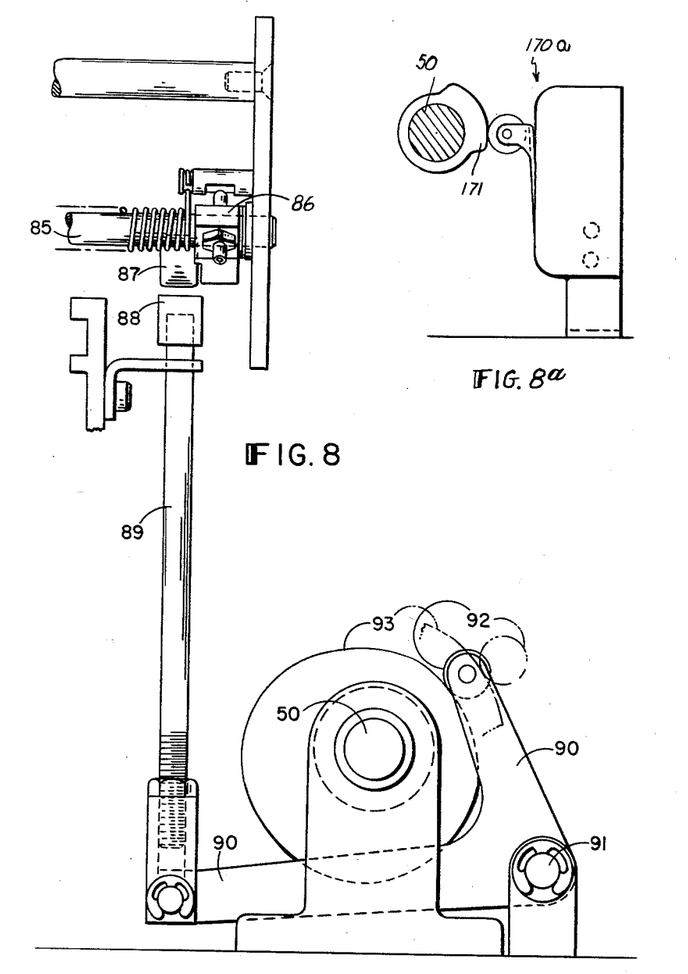
FIG. 8 is a fragmentary diagram taken from the front and the same point of view as FIG. 3.
FIG. 8A is a fragmentary view taken on the line 8A—8A of FIG. 2.

Rock shaft 75 which moves the print wheels to and from printing and inking positions is rocked by connections from the main camshaft of the machine so as to carry the print wheels to inking position and back to printing position in each cycle of operation of machine. These connections are best seen in FIGS. 2 and 8. Referring to FIG. 2, shaft 75 is connected by gears 83 and 84 to a rock shaft 85 to which is fastened a crank arm 86 carrying a follower roll 87. A tappet 88 upon a lifter rod 89 is adapted to lift the follower roll 87. As shown in FIG. 8 lifter rod 89 is given its up and down motion by a bell crank 90, pivoted at 91 and carrying a follower roll 92 which is engaged by a cam 93 on the main camshaft 50.

Figure 3:
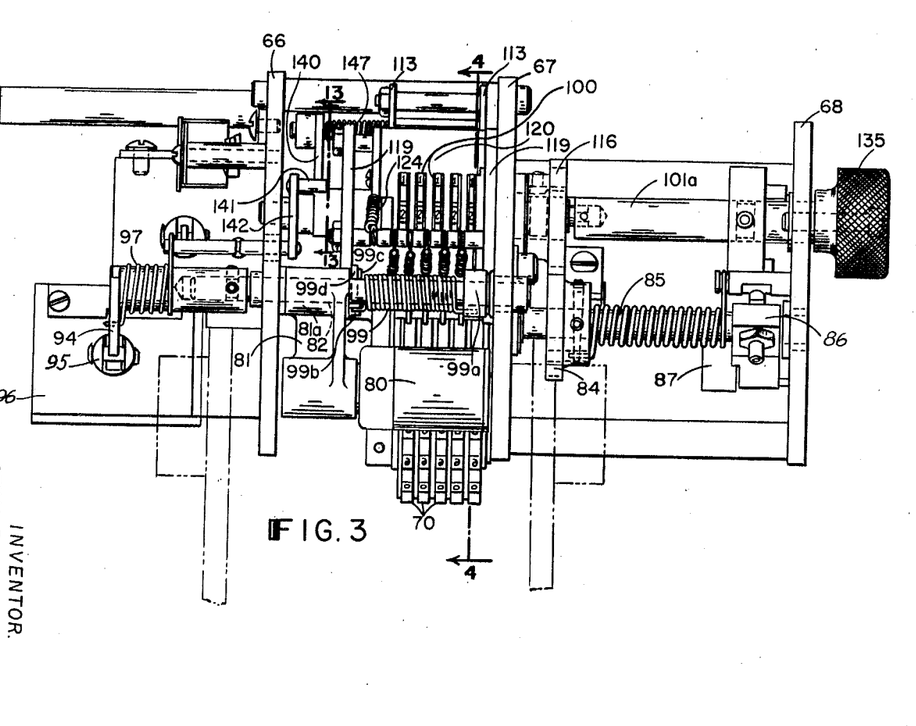
FIG. 3 is a front elevation, as viewed from the right of FIG. 1, of the upper portion of the machine.

The ink roll rock shaft 82 is adapted to move the ink roll into and out of its full line position of FIG. 4, in which full line position it will engage with the print wheels when these are swung to inking position. In its broken line inoperative position of FIG. 4 the ink roll clears the print wheels and no ink is applied. Ink roll rock shaft 82, FIG. 3, is journaled in frame plates 66 and 67 and carries outside of the frame a crank arm 94.

Figure 9:
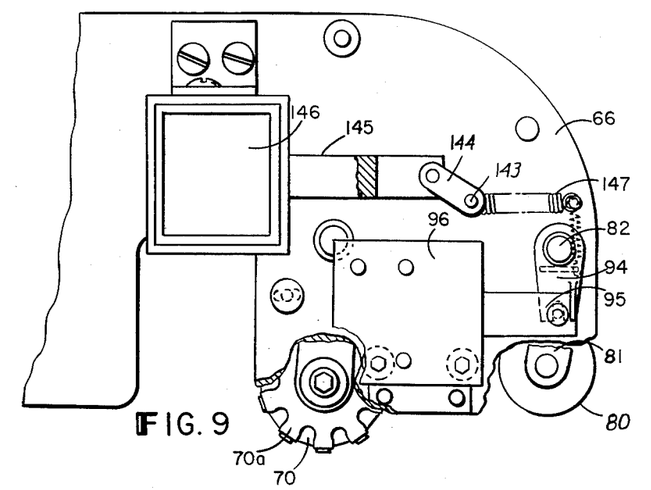
FIG. 9 is a fragmentary left side elevation to a larger scale than FIG. 1, and with parts broken away.

As shown in FIG. 9, arm 94 is connected by a pin and slot connection to the movable armature 95 of a solenoid 96. Energization of solenoid 96 thus rocks shaft 82 to move the ink roll to operative position. A coil spring 97, FIG. 3, rocks shaft 82 in the opposite direction when the solenoid 96 is deenergized.

The ink roll arm 81 is yieldingly mounted on shaft 82 to permit the ink roll to yield when engaged by the print wheels 70. Referring to FIG. 3, the hub 81a of arm 81 is rotatable on shaft 82. A coil spring 99 has one end fast in a collar 99a fast on shaft 82 and its opposite end bears against a shoulder 99b on hub 81a, tending to rotate the arm 81 relative to shaft 82, away from the observer in FIG. 3. Another shoulder 99c on hub 81a is engaged by a stop pin 99d in shaft 82. The ink roll and its arm can thus yield toward the observer in FIG. 3, against the force of the spring 99.

The setting-changing mechanism includes five index gears 100 for units, ten's, hundred's, thousand's and ten-thousand's respectively, rotatable on a shaft 101 and each consisting of a ten toothed gear meshing with one of the idler gears and carrying the characters "0" through "9" which are visible to the operator. Each such toothed gear wheel 100 has fastened thereto a smaller diameter toothed drive ring 102 having nine shallow notches 103, FIG. 5 and one deep notch 106.

Figure 5:
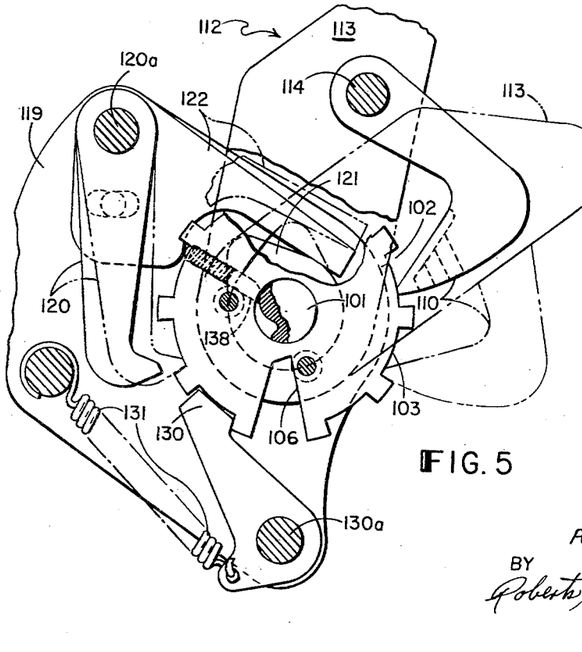
FIG. 5 is a diagram on a larger scale than FIG. 4 showing portions of the drive mechanism for the counter, and in particular the counter drive pawl, one of the drive rings driven by this pawl, a stop pawl for the drive rings, a cam for operating the stop pawl, and a detent pawl.
Figure 6:
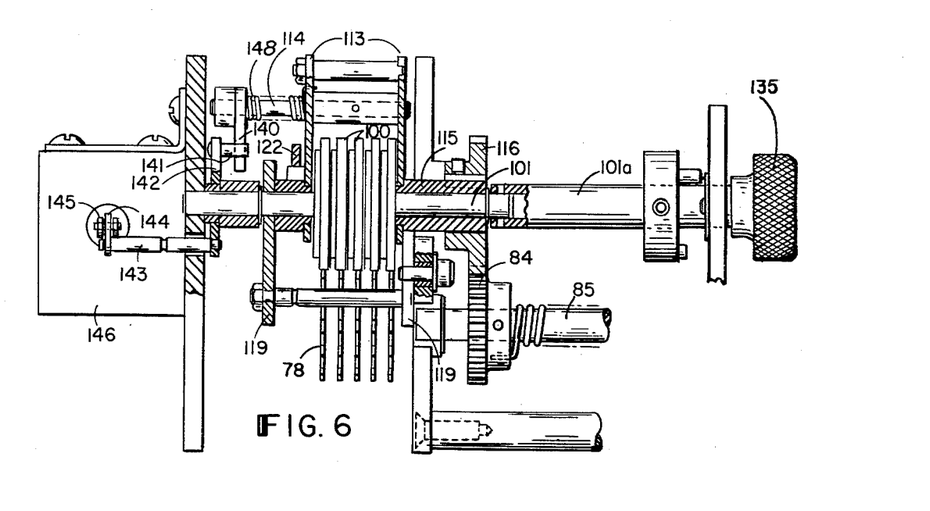
FIG. 6 is a vertical partial section taken mainly on line 6—6 of FIG. 4 through the axis of the counter gears.

A pawl carrier indicated generally at 112, FIG. 5, including two interconnected side plates 113, FIG. 6, is rockable about shaft 101. A stepped drive pawl 110, FIGS. 4 and 5, is fast upon a shaft 114 which is journaled in the side plates 113 and is rocked with its carrier. Referring to FIG. 6, the right-hand side plate 113 of the pawl carrier is secured to a rotatable sleeve 115 having fast thereon a gear 116 which meshes with the gear 84 on the rock shaft 85. These gears 116 and 84 may also be seen in FIG. 2. Thus at each cycle the pawl carrier is rocked from its full line position of FIG. 5 to its broken line position. By engagement of the stepped pawl 110 with one or more of the drive rings 102, rocking of the pawl results in the setting of the index gears 100 being advanced one unit. Since the index gears 100 are in meshed relation with the idler gears 78 and these in turn are in meshed relation with the numbering print wheels 70 and also with the numbering interposer gears 22a, the setting of the numbering print wheels and interposers is also advanced one unit.

This change in the setting of the print wheels and interposers takes place as the numbering print wheels are rocked to inking position, and the type characters for printing the changed number receive ink.

Figure 10A:
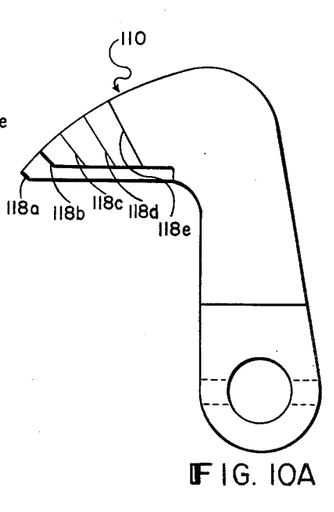
FIGS. 10A and 10B are respectively a side and an end elevation of the counter wheel drive pawl.
Figure 10B:
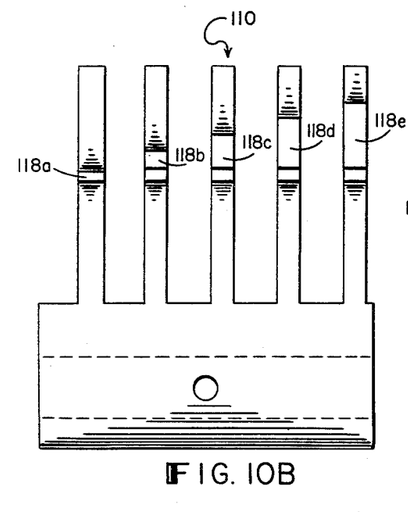

The stepped drive pawl 110 shown in detail in FIGS. 10A and 10B has five prongs 118a to 118e inclusive for engagement with the respective drive rings 102 of the five index gears 100, the longest prong 118a engaging the units' index gear drive ring.

The engagement of a prong of the stepped drive pawl with any given drive ring prevents engagement of the pawl with the drive rings of any higher order index gear excepting in the case when the driving engagement with the given drive ring is in the deep notch 106 thereof. In this latter case the pawl is able to engage the drive ring of the index gear of next higher order and drive that index gear also. This enables the pawl to perform the function of a carry-over device, whereby when one index gear goes from "9" to "0" setting the next higher order index wheel is advanced one position.

When "99999" is reached the pawl is adapted to engage all five drive rings, the deep notches of the first four coinciding and allowing the shortest prong 118e to engage the highest-order drive wheel, whereupon another operative stroke of the pawl would drive the five index wheels and bring the reading to "00000."

Other forms of counting means could be substituted.

The counter assembly is shown as including stationary side plates 119, 119, FIG. 3.

Referring to FIG. 5, a stop or locking pawl 120, pivoted on a cross connection 120a between plates 119, 119 is operated by a cam 121 which rocks with the pawl carrier 112 and a cam follower arm 122 which rides on the cam 121, the stop or locking pawl being urged by a spring 124, FIGS. 4 and 3, toward its unlocked position. This pawl prevents over-running of any of the index wheels as they are driven by drive pawl 110. As shown in FIG. 3 stop pawl 120 is slotted so as not to interfere with the index gears 100 and to form prongs which reach in beside the gears and engage their respective drive rings 102, as in the broken-line position of the pawl in FIG. 5.

Detent pawls 130 for the several drive rings are pivotally supported on cross connections 130a within the counter frame and are spring urged by springs 131 into the notches of the respective drive rings and releasably hold them in indexed position.

It will be noted that the shaft 101 about which the pawl carrier rocks and about which the index gears are rotated by the action of the pawl may be rotated within this assemblage, to set the index gears forward manually to zero position. An extension 101a of shaft 101, FIG. 3, carries a knob 135 by which shaft 101 can be rotated.

As indicated in FIG. 5, each drive ring 102 carries in a recess therein a spring pressed plunger 138, and shaft 101 is suitably recessed to receive these plungers. Thus one revolution of shaft 101 clockwise in FIG. 5 will carry any of the drive rings and their index gears which are not already in zero position forwardly into zero position, leaving the whole bank of wheels in their zero settings.

The stop pawl 120 does not interfere with the manual setting of the index gears, because this stop pawl is normally free of the drive rings 102 as shown in full lines in FIG. 5, only being brought to its broken line locking position when the pawl carrier is rocked clockwise.

The operator can also manually set the index gears for any number within their capacity by turning the appropriate index gear or gears forward to the appropriate setting by means of a stylus. Thus a run may be started at any desired number.

In both repeat and consecutive operations an automatic change in setting will take place when the first ticket section reaches the rear or punching station. Accordingly a manual setting of the index wheels should be to a setting one less than the first number to be printed and punched.

Means are provided for suppressing the action of setting-changing. The drive pawl 110 is rocked at each cycle, but is ineffective when not allowed to engage with any of the drive rings 102.

Figure 13:
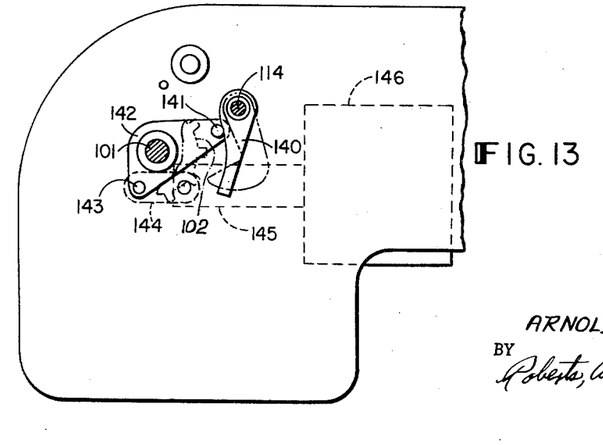
FIG. 13 is a diagram in the nature of a vertical partial section taken on line 13—13 of FIG. 3.

Referring to FIGS. 6 and 13, the shaft 114 on which the drive pawl 110 is fast carries a follower arm 140 adapted to be engaged by a stop pin 141 carried by a plate 142 which is rockable about the shaft 101. The plate 142 is connected by a pin 143 and link 144 to the movable armature 145 of a solenoid 146. A spring 147, FIG. 9, yieldingly urges the parts to move the pin 141 away from the observer in FIG. 6 or clockwise in FIG. 13 to the position shown in FIG. 13 to engage the pin 141 with the undersurface of the follower arm 140. In this position of FIG. 13 the drive pawl 110 clears all of the drive rings 102 and no change in setting is made. Energization of the solenoid 146 withdraws pin 141 from engagement with the follower arm 140 and allows the drive pawl 110 to engage one or more drive rings. A spring 148, FIG. 6, acting on follower arm 140, urges the drive pawl toward the drive rings.

The machine is arranged to effect printing and punching operations at different times such that an automatic change in setting can be made between these operations.

The cams 53 and 54 of FIG. 2 which control the raising and lowering of the bed 30 are given a form such that in each cycle they raise the bed through a short stroke of for example 3/64 inch, return it to bottom position, then raise it through a longer stroke, for example 3/16 inch.

The short stroke is sufficient to bring a ticket section into printing relation to the numbering print wheels when these latter are in printing position but this short stroke is not sufficient to operate the punches.

The long stroke of the bed is sufficient to operate the punches, and this long stroke takes place while the numbering print wheels are out of printing position and hence out of the way of this long stroke of the bed.

It will be observed that the timing of the presence of the print wheels in printing position and the short stroke of the bed relative to the time of the long stroke of the bed is made such that operation at the rear one of the two stations follows an operation at the forward one of the two stations in the cycle. Where, as preferred, the printing station is forward of the punching station, this places the short printing stroke before the long punching stroke in the cycle, the reverse would be true if the locations of the printing and punching stations were interchanged.

Thus, in the machine shown, in case a setting-change is to be made the change takes place between printing at the forward printing station and punching at the adjacent punching station. If the change is from "00001" to "00002" the ticket section at the printing station is printed "00001" and the ticket section at the punching station is then punched "00002."

Although it is not fundamentally necessary that the printing stroke be so short that it will not operate the punches at the time of printing, this feature is deemed highly advantageous. If the printing stroke of the bed were as long as the punching stroke of the bed, each ticket section would be punched twice, and when a change in setting occurred between these two punchings, excess punching would appear. A more complicated code which ignored the excess punching would then need to be used. For example, if the punching station were to punch a ticket section with perforations indicative of "00001" and also with perforations indicative of "00002" the code would need to be such that the superfluous punched hole or holes would be ignored or would not affect the reading.

It may be observed that in many cases the index gears 100 will be initially set at "00000" and the numbering print wheels and interposers will have the corresponding setting. As will appear below, this does not require printing or punching any ticket section with this "00000" designation.

The change in setting is preferably conditioned upon a ticket section being present at the punching station. For consecutive numbering the change when permitted to take place by presence of a ticket section at the punching station, will take place at each cycle. For repeat numbering such change in setting is suppressed for as many cycles as correspond to repeated printing and punching, and will occur only when a leading section of a ticket is presented to the rear or punching station and no ticket spans the two stations. In either case however the change, when made, will intervene between the time of printing at a print station and the time of punching at the punching station in the same cycle. Thus for either type of operation there is a constant relation between the settings of the numbering wheels and their corresponding interposers.

Thus when the first section of ticket material is delivered to the punching station, and the index wheels are in their "00000" setting, there will be an attempted printing at the printing station with the numerals "00000," but no ticket section there to receive this printing, then change in setting to "00001," and a punching of this indicia at the punching station. This punched ticket section will receive the printed "00001" in the next cycle at the printing station before the time for change in setting.

Control—In General

While the suppression of operation of the setting-changing means and inking means could be controlled either mainly or entirely mechanically, it is more convenient to employ a largely electrical form of control. One reason for this is that it is desirable for the ticket material to be sensed in the punching die during a period which includes both forward feed of the material and the printing up-and-down movement of the bed (both of which operations precede the setting change by only a small part of the cycle). These requirements are best met by a microswitch which can participate in the up-and-down movement of the bed and respond to the slight thickness of the ticket material if the latter is in the die either moving forward, stationary, or moving up and down. A further reason for a largely electrical form of control is that the largely electrical form of control here shown will permit the control system's final decision as to whether to suppress setting change and inking to be made only a short time before the time when these operations are scheduled in the cycle, and yet let this decision be put into effect in due time, thereby permitting high speed operation of the machine as a whole.

Referring to FIGS. 11 and 12 a normally open microswitch 150 is mounted on the stripper plate 32 and is controlled by a plunger 151 which extends upwardly from a feeler element 152 resting on the lower die element 30a and slidable vertically within the upper die element 31. Introduction of the ticket material into the punching station closes the microswitch 150.

Control Circuit

Figure 16:
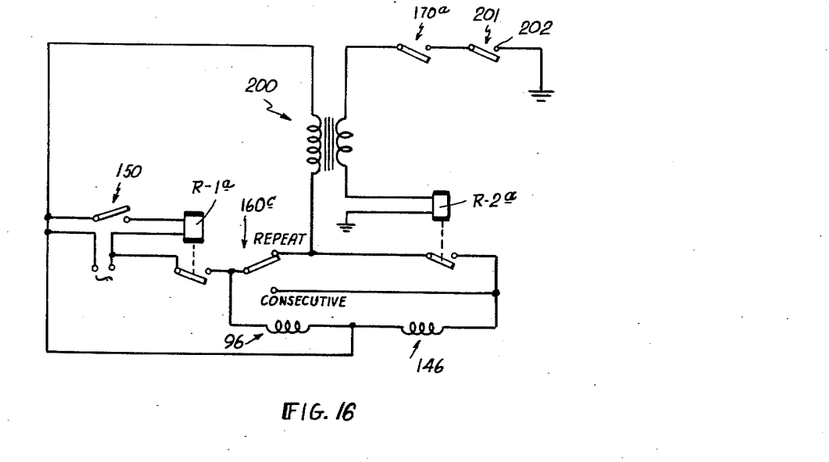
FIG. 16 is a wiring diagram of a control circuit for the machine.

Referring to the wiring diagram of FIG. 16 the die sensing microswitch 150 closes the activating circuit of an automatic switch R–1a which controls the energization of both the ink solenoid 96 and the setting changing solenoid 146.

As a result, before the first ticket section reaches the punching station and after the last ticket section of a run has left the punching station, there can be no inking or automatic change in setting. In any of the types of operation described below, no change in setting occurs and no inking occurs in any cycle in which a ticket section is not delivered to the punching station, because the opening of die sensing switch 150 and deenergization of the operating coil of automatic switch R–1a breaks the circuits to the ink solenoid 96 and the setting-changing solenoid 146.

In the circuit of FIG. 16, with selector switch 160c in an open position the printing and punching are both continuous, i.e. the same number is printed and punched continuously and no automatic change in setting takes place. With switch 160c set at "consecutive" the change takes place for each ticket section. Set at "repeat" the change takes place as controlled by the ticket material, the machine including additional sensing means which prevents the operation of the setting-changing means when a ticket spans the printing and punching stations.

For a change in setting, either in consecutive or repeat operation, the pin 141 is withdrawn by solenoid 146 from the path of the follower arm 140 of FIG. 13, allowing the drive pawl 110, when rocked, to engage one or more of the index drive rings 102 to change the setting by one digit. This rocking of the pawl 110 and change of the setting occurs as the print wheels are rocked to inking position after the short printing stroke of the bed.

Repeat Operation

In repeat operation, energization of the setting-changing solenoid is secured through a circuit which includes automatic switch R–1a when energized, switch 160c in the repeat position and an automatic switch R–2a when energized.

Figure 17:
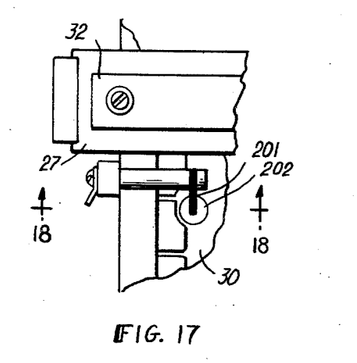
FIG. 17 is a fragmentary plan view showing a portion of the punching station, a portion of the bed at the adjacent numbering printing station, and additional sensing means employed at this printing station in connection with the control circuit of FIG. 16.
Figure 18:
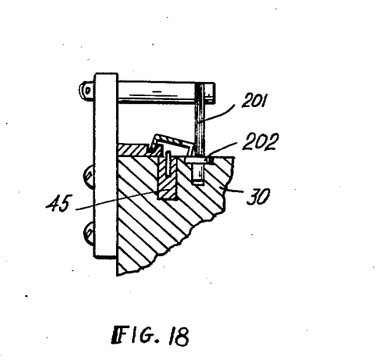
FIG. 18 is a fragmentary vertical sectional view on the line 18—18 of FIG. 17.

With the die sensing switch 150 closed and the operating coil of automatic switch R–1a accordingly energized, a circuit is established through contact 6 of automatic switch R–1a and the primary of a transformer 200. The actuating coil of automatic switch R–2a is in a circuit which includes the secondary of the transformer and also a sensing brush 201 consisting of a bundle of wires located at the printing station in a position to penetrate a sensing hole in a last or trailing section of a ticket at the printing station, to make electrical contact with a stationary contact plate 202 (FIGS. 17 and 18). This contact is prevented by ticket material at the area on which the end of the brush rests.

Such a sensing hole is indicated at 203 in the last or trailing sections of the tickets shown in FIG. 14 as printed and punched by repeat operation.

Then either if no ticket section occupies the printing station or if a last or trailing ticket section having a sensing hole occupies the printing station, automatic switch R–2a will be actuated and the setting-changing solenoid 146 will be actuated, provided of course that automatic switch R–1a is actuated by the die sensing switch being closed. Change of setting is prevented in the event of sections of the same ticket being printed and punched because under these conditions a section lacking a sensing hole is present at the printing station and the setting-changing solenoid 146 remains deenergized.

The sensing brush 201 need not necessarily be located at the printing station but may be at one step of feed in rear thereof. The brush 201 could, in theory, be located at the punching station in which case the sensing hole 203 would be in the leading instead of the trailing section of each ticket. The sensing of a hole 203 would again indicate that the same ticket did not span the two stations.

Preferably the sensing brush penetrates the sensing hole and makes contact with the contact plate 202 in a deenergized condition, is energized only after the feeding stroke is completed, and is again deenergized shortly after the change in setting is completed. This may be accomplished by insertion in the circuit to the brush 201 of a normally-open switch 170a operated by a cam 171 on shaft 50 as shown in FIG. 8a. This cam-operated switch 170a is held closed by its cam during the part of the cycle in which brush 201 is to be energized as indicated above.

Consecutive Operation

When the selector switch 160c is set for "consecutive" the transformer 200, sensing brush 201 and automatic switch R–2a are continuously deenergized and the setting-changing solenoid 146 is controlled solely by the die sensing switch 150 and automatic switch R–1a. In this operation an automatic change in setting is made in each cycle at which a ticket section is delivered to the punching station.

Continuous Operation

When the selector switch 160c is left in an intermediate open position the setting changing solenoid 146 is deenergized, no automatic change in setting takes place and all ticket sections are punched and printed with identical indicia.

Timing Diagram

It may be seen that the die sensing switch 150 is initially closed by the leading ticket section of a batch at the 10° point of the cycle. This switch would of course remain closed as long as ticket material is at the switch. The feed of ticket material continues to 65° and the printing occurs at 90°.

The swinging of the bank of print wheels to inking position takes place from 115° to 170° and it is during this swinging movement to inking position that the change in setting can occur. With the print wheels still in inking position punching occurs near the 270° position.

Provided the die sensing switch 150 is closed by ticket material at the punching station, and if the ticket section delivered to the printing station has a sensing hole or if no ticket section is delivered to the printing station, the circuit through sensing brush 201 will be closed from about 75° to about 170° under control of cam-driven switch 170a, and the change in setting will take place between 115° and 170°.

Inking Control

It can be seen that there is no inking of the print wheels in any cycle in which a ticket section is not delivered to the die sensing switch or detector 150. Since, as explained in connection with the timing diagram, the time for inking follows the time for printing in any cycle, the print wheels are left uninked at the end of the cycle in which they have printed the last section of the procession of ticket material. The print wheels are not further inked in any of the cycles in which the machine is run to clear it of printed and punched ticket material. In the next run, the print wheels are not inked in any cycle preceding delivery of the first section of ticket material to the sensing switch 150. During the printing stroke of the bed in this cycle in which the first section of ticket material is delivered to the sensing switch 150, the print wheels are still in uninked condition, and only receive ink after the attempted printing at the empty printing station and the subsequent automatic change in setting in this cycle. Thus the printing wheels do not operate in inked condition except in cycles in which a ticket section receives a printing impression.

I claim:

1. In an indicia-applying machine, two indicia-applying devices having changeable settings and interconnected to apply corresponding indicia at successive stations, a vertically movable bed cooperating with said devices to effect operation thereof, means for moving one of said devices into and out of position to cooperate with the bed, the bed having a short operative stroke ending when said movable device is in position to cooperate with the bed and having a long operative stroke ending when said movable device is out of position to cooperate with the bed.

2. An indicia-applying machine as claimed in claim 1, including means for advancing sectional ticket material from one said station to the other, the two said strokes of the bed taking place between successive such advances, and means for automatically changing the setting of the two devices in between the two said strokes of the bed.

3. An indicia-applying machine including two indicia-applying devices having changeable settings and interconnected to apply corresponding indicia at successive stations, one of said devices including a rotatable type-carrying member, the machine including a vertically movable bed, an idler gear adapted to turn said type-carrying member to change its setting, means for rocking the type-carrying member around the axis of the idler gear, out of printing position and back to printing position, means for advancing sectional ticket material section by section from one said station to the other, means for operating the bed twice per advance of the ticket material through the length of a ticket section, one such operation of the bed being a relatively short operative stroke occurring when the type-carrying member is in printing position relative to the bed and the other such operation being a longer operative stroke occurring when the type-carrying member is out of printing position, and means for automatically turning the idler gear to change the setting of the type-carrying member in between said two operations of the bed.

4. An indicia-applying machine as claimed in claim 3 in which the time of the type-carrying member's presence in printing position and the time of operation of the bed with its relatively short stroke when the type-carrying member is in printing position are so related to the time of the other operation of the bed that for a given cycle which includes advance of the ticket material and the two operations of the bed, an indicia-applying operation at the rear one of the two stations follows an indicia-applying operation at the forward one of the two stations.

5. An indicia-applying machine as claimed in claim 3 in which the type-carrying member is at the forward one of said stations, and in a given cycle, which includes advance of the ticket material and the two operations of the bed, the short stroke of the bed precedes the long stroke of the bed.

6. In a printing and punching machine, a printing device including a type-carrying gear, an idler gear meshing therewith, a punching device including punching elements and an interposer-carrying gear connected to said idler gear, a vertically movable bed for effecting printing by the type-carrying gear and punching by the punches, means for rotating the idler gear to advance the setting of the type-carrying gear and interposer-carrying gear, means for rocking the type-carrying gear around the axis of the idler gear, out of printing position and back to printing position, the bed having a short printing stroke ending when the type-carrying gear is in printing position and having a long punching stroke ending when the type-carrying gear is out of printing position.

7. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, and means for controlling said setting-changing means comprising means for suppressing operation of the setting-changing means in the event of said operations being upon sections of the same ticket which spans said stations, said last named means including a detector for distinguishing between presence and absence of sensible ticket material, and means whereby detection of such presence prevents operation of the setting-changing means.

8. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, and means for controlling said setting-changing means comprising means for suppressing operation of the setting-changing means in the event of said operations being upon sections of the same ticket which spans said stations, said last named means including a detector for distinguishing between determined area comprising a part of the area occupied by a ticket section at or in rear of the foremost station, and means whereby detection of such presence prevents presence and absence of sensible ticket material at a pre-operation of the setting-changing means.

9. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, and means for controlling said setting-changing means, said last named means including a first ticket material sensing means at the rear one of said stations, a second ticket material sensing means, and means controlled jointly by the two sensing means for permitting operation of the setting-changing means upon sensing of ticket material by the first mentioned sensing means in conjunction with sensing of absence of ticket material by the second mentioned sensing means.

10. An indicia-applying machine as claimed in claim 9 including manually settable means for relieving the permitting means from the control of the second sensing means, leaving the permitting means under the control of the first sensing means.

11. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, and means for controlling said setting-changing means, said last named means including a first ticket material sensing means at the rear one of said stations, a second ticket material sensing means, and means including an electric circuit controlled jointly by the two sensing means for permitting operation of the setting-changing means upon sensing of ticket material by the first mentioned sensing means in conjunction with sensing of absence of ticket material by the second mentioned sensing means.

12. An indicia-applying machine as claimed in claim 11 including switching means adapted to establish an alternate circuit for permitting operation of the setting-changing means upon sensing of ticket material by the first sensing means irrespective of sensing by the second sensing means.

13. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, and means for controlling said setting-changing means, said last named means including a first sensing means at the rear one of said stations, a transformer, a circuit whereby the primary of the transformer is energized when said first sensing means senses ticket material at said rear station, a second sensing means and means including a circuit which includes the secondary of said transformer and said second sensing means for permitting operation of the setting-changing means upon sensing of ticket material by the first sensing means at the rear station in conjunction with sensing of absence of ticket material by the second sensing means.

14. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, electromagnetic means controlling the operation and non-operation of the setting-changing means, a first ticket material sensing means at the rear one of said stations, a second ticket material sensing means, and a circuit controlled jointly by the two sensing means and controlling said electromagnetic means.

15. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, electromagnetic means controlling the operation and non-operation of the setting-changing means, a first ticket material sensing means at the rear one of said stations, a second ticket material sensing means, a circuit controlled jointly by the two sensing means and controlling said electromagnetic means, and switching means for relieving the electromagnetic means from the control of the second sensing means, leaving the electromagnetic means under the control of the first sensing means.

16. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, electromagnetic means controlling the operation and non-operation of the setting-changing means, a first ticket material sensing means at the rear one of said stations, a second ticket material sensing means, a first automatic switch controlled by the first sensing means, and a second automatic switch under the joint control of the first automatic switch and the second sensing means, said second automatic switch controlling said electromagnetic means.

17. An indicia-applying machine as claimed in claim 16 including switching means for transferring control of the electromagnetic means from the second automatic switch to the first automatic switch.

18. In an indicia-applying machine, two indicia-applying devices having changeable settings and interconnected to apply corresponding indicia at successive stations in the same cycle of operation of the machine, means for advancing sectional ticket material step by step to said indicia-applying devices, means for automatically changing the setting of said devices in between the operations of the respective devices in a given cycle, electromagnetic means controlling the operation and non-operation of the setting-changing means, a first ticket material sensing means at the rear one of said stations, a second ticket sensing means, a first automatic switch controlled by the first sensing means, a second automatic switch controlled jointly by the first automatic switch and the second sensing means, and a circuit for energizing the electromagnetic means, said circuit including the two automatic switches in their closed positions.

19. An indicia-applying machine as claimed in claim 18 including switching means for establishing an alternate circuit, by-passing the second automatic switch, for energizing the electromagnetic means.

References Cited in the file of this patent

UNITED STATES PATENTS

| | | |
|---|---|---|
| 2,189,027 | Fuller | Feb. 6, 1940 |
| 2,645,994 | Carroll | July 21, 1953 |
| 2,655,098 | Dutro et al. | Oct. 13, 1953 |
| 2,708,873 | Braun | May 24, 1955 |
| 2,765,733 | Gollwitzer | Oct. 9, 1956 |
| 2,803,187 | Hart et al. | Aug. 20, 1957 |
| 2,911,905 | Marvin et al. | Nov. 10, 1959 |